(12) United States Patent
Bartolomucci et al.

(10) Patent No.: US 9,073,422 B2
(45) Date of Patent: Jul. 7, 2015

(54) WEATHERSTRIP ASSEMBLY AND METHOD OF MANUFACTURING THE SAME

(75) Inventors: Mark Bartolomucci, Deckerville, MI (US); Chao Xu, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 370 days.

(21) Appl. No.: 13/565,356

(22) Filed: Aug. 2, 2012

(65) Prior Publication Data

US 2014/0033614 A1 Feb. 6, 2014

(51) Int. Cl.
*B22D 11/126* (2006.01)
*B60J 10/08* (2006.01)
*B60J 10/00* (2006.01)
*E06B 7/23* (2006.01)

(52) U.S. Cl.
CPC .................. *B60J 10/088* (2013.01); *E06B 7/23* (2013.01); *B60J 10/0011* (2013.01)

(58) Field of Classification Search
USPC ...................... 29/449, 527.1, 450, 451, 527.2; 49/490.1; 181/204; 246/177.1, 177.17, 246/177.19, 285, 339
See application file for complete search history.

(56) References Cited

U.S. PATENT DOCUMENTS

| | | | |
|---|---|---|---|
| 3,222,769 A | 12/1965 | Le Plae | |
| 3,706,173 A | 12/1972 | Taylor | |
| 4,745,665 A | 5/1988 | Hilsenbeck | |
| 5,072,546 A * | 12/1991 | Ogawa | 49/490.1 |
| 5,651,218 A | 7/1997 | Bright | |
| 6,001,178 A | 12/1999 | Bergmann | |
| 6,447,928 B2 | 9/2002 | Suitts | |
| 6,458,301 B1 | 10/2002 | Hendrix | |
| 6,619,425 B2 * | 9/2003 | Miyakawa et al. | 181/204 |
| 6,935,072 B2 * | 8/2005 | Kogiso et al. | 49/490.1 |
| 7,517,590 B2 | 4/2009 | Wagner | |
| 7,604,766 B2 | 10/2009 | Bonds | |
| 2009/0000205 A1 | 1/2009 | Bright | |
| 2010/0212230 A1 | 8/2010 | Ogilvie | |

FOREIGN PATENT DOCUMENTS

GB 1597141 9/1981

* cited by examiner

*Primary Examiner* — Richard Chang
(74) *Attorney, Agent, or Firm* — Ralph E Smith

(57) ABSTRACT

A method of manufacturing a weatherstrip assembly may include forming an elongated reinforcement member, forming an elongated seal member, and trimming ends of the seal member and the reinforcement member. The reinforcement member and the seal member may be formed from first and second materials, respectively. The seal member may be formed around the reinforcement member such that the reinforcement member is at least partially embedded in the seal member. The seal member may include a plurality of sealing lips. The ends of the seal member and the reinforcement member may be trimmed using a laser cutter that is movable in multiple axes.

17 Claims, 3 Drawing Sheets

WEATHERSTRIP ASSEMBLY AND METHOD OF MANUFACTURING THE SAME

FIELD

The present disclosure relates to weatherstrip assembly and a method of manufacturing the weatherstrip assembly.

BACKGROUND

Weatherstrip assemblies are used in modern vehicles to seal vehicle doors and/or windows to reduce or prevent noise, moisture, weather elements (e.g., rain, snow and ice) and other foreign debris from entering an interior of the vehicle. Such weatherstrip assemblies may include complex cross-sectional geometry of sealing flanges and lips that form a sealed relationship between two or more stationary or movable components. For example, weatherstrip assemblies may form a sealed relationship between the vehicle door and vehicle frame and/or between the window pane and the vehicle door while still allowing the user to move the door relative to the frame and move the window pane relative to the door.

Weatherstrip assemblies for vehicle doors, window, and hoods are typically manufactured by cutting weatherstrip lengths exiting an extruder and joining the weatherstrip lengths to each other to form a continuous seal that can be installed around a perimeter of the door or window opening. The lengths are typically cut using a bladed cutting tool (e.g., a saw or knife) and one or more trimming dies to ensure that the cuts are made at the correct locations and to avoid compressing the sealing flanges and lips during the cutting process, which could deform the cross-sectional geometry of the weatherstrip. Cutting the weatherstrip lengths using these trimming dies hinders the speed of the manufacturing process, occupies a large amount of production-floor space and results in high tooling and production costs.

SUMMARY

In one form, the present disclosure provides a method of manufacturing a weatherstrip assembly. The method may include forming an elongated reinforcement member, forming an elongated seal member, and trimming ends of the seal member and the reinforcement member. The reinforcement member and the seal member may be formed from first and second materials, respectively. The seal member may be formed around the reinforcement member such that the reinforcement member is at least partially embedded in the seal member. The seal member may include a plurality of sealing lips. The ends of the seal member and the reinforcement member may be trimmed using a laser cutter that is movable in multiple axes.

In some embodiments, the reinforcement member may be formed to include a generally U-shaped cross section. The first material may be a metallic material, and the reinforcement member may be formed to include a plurality of slots extending therethrough.

In some embodiments, forming the seal member may include forming first, second and third portions of the seal member. The first portion may be adapted to sealingly engage a first flange of a vehicle door frame. The second portion may be adapted to sealingly engage a second flange of the vehicle door frame. The third portion may be adapted to sealingly engage a window pane. Trimming the end of the seal member may include trimming the first, second and third portions of the seal member to first, second and third lengths, respectively.

Trimming the end of the seal member may include cutting a portion of the seal member, then moving the laser cutter relative to the seal member, and then cutting another portion of the seal member.

In some embodiments, the method may include abrading the end of the seal member after the end is trimmed. After abrading the end, the seal member may be molded to another seal member.

In another form, the present disclosure provides a method of manufacturing a weatherstrip assembly for a vehicle that may include forming an elongated seal member to include first, second and third portions of the seal member. The first portion may be formed to include at least one first sealing lip adapted to sealingly engage a first flange of a vehicle door frame. The second portion may be formed to include at least one second sealing lip adapted to sealingly engage a second flange of the vehicle door frame. The third portion may be formed to include at least one third sealing lip adapted to sealingly engage a window pane. An end of the seal member may be trimmed using a cutting device that includes at least one of a laser cutter and a wire-cutting electrical discharge machine.

In some embodiments, the cutting device may include a robotic arm adapted to move the cutting device relative to the seal member in multiple axes.

In some embodiments, the method includes forming a reinforcement member having a generally U-shaped cross section. The seal member may be formed by extruding a polymeric material around the reinforcement member.

In some embodiments, the method may include providing a production line on which the seal member is formed, then conveyed to a trimming station to be trimmed by the cutting device, and then conveyed to a cleaning station to remove soot from the seal member. In some embodiments, the production line may include a fume hood proximate the cutting device.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
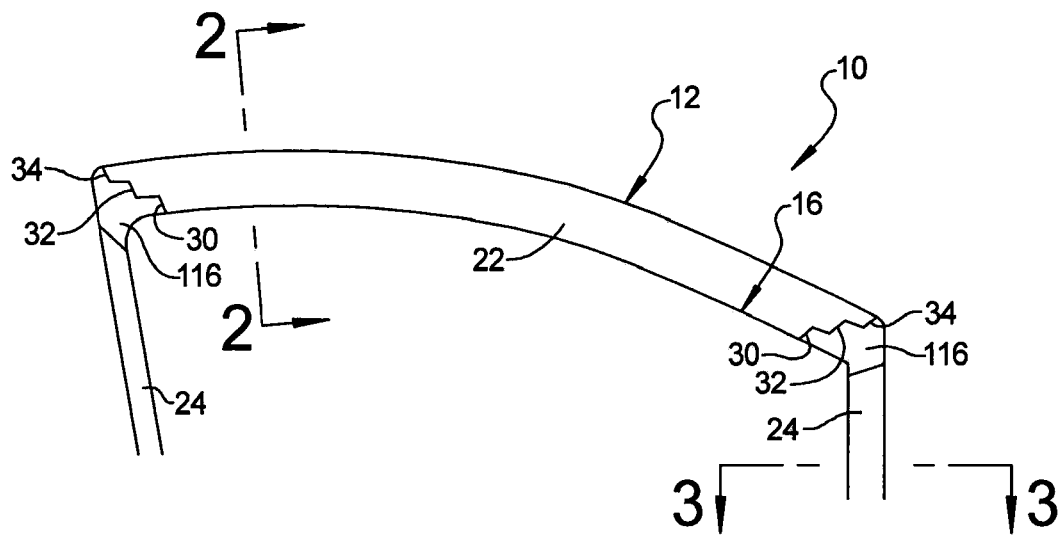
FIG. 1 is a partial schematic view of a vehicle door frame having a weatherstrip assembly according to the principles of the present disclosure.
Figure 2:
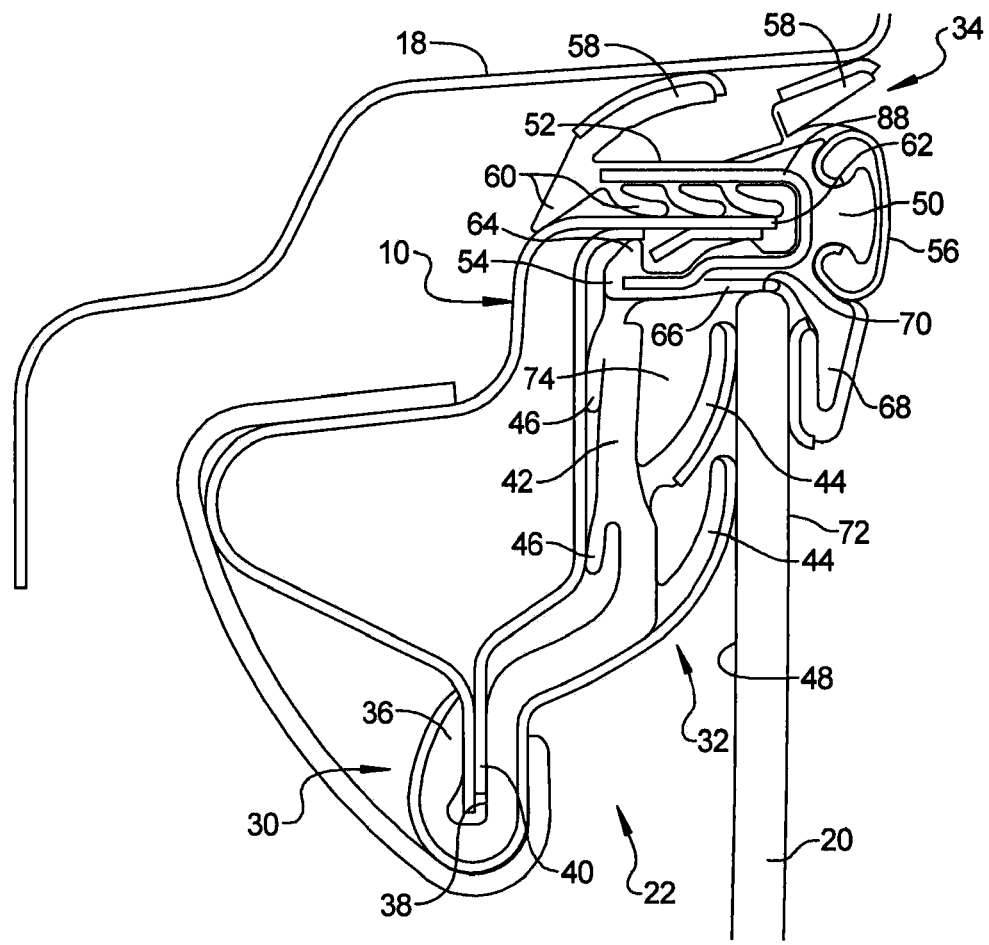
FIG. 2 is a cross-sectional view of the vehicle door frame and a portion of the weatherstrip assembly taken along line 2-2 of FIG. 1.
Figure 3:
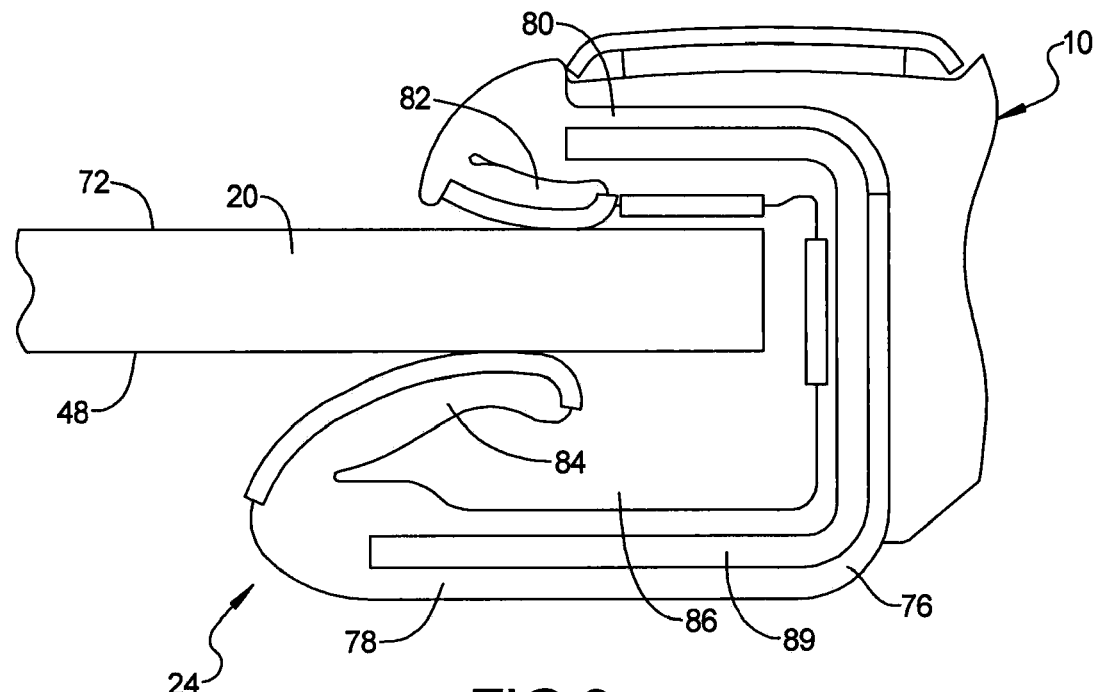
FIG. 3 is a cross-sectional view of the vehicle door frame and another portion of the weatherstrip assembly taken along line 3-3 of FIG. 1.

In an exemplary embodiment and with reference to FIGS. 1-3, a door frame 10 for a vehicle is provided that may include a weatherstrip assembly 12. The weatherstrip assembly 12 may be attached to the door frame 10 at or near an outer perimeter of the door frame 10 and/or at or near a perimeter of a window opening 16 of the door frame 10. The weatherstrip assembly 12 may provide a seal between the door frame 10 and a vehicle body frame 18 (FIG. 2) and/or between the door frame 10 and a window 20 (FIGS. 2 and 3) disposed in the window opening 16 of the door frame 10. The weatherstrip assembly 12 may include a plurality of weatherstrip sections, including a header section 22 (FIGS. 1, 2 and 5) and pillar sections 24 (FIGS. 1 and 3) that may be joined together to form a continuous seal. As will be subsequently described, the present disclosure also provides a method for manufacturing the weatherstrip assembly 12 that includes cutting ends of the weatherstrip sections using a robotic laser cutter or a wire-cutting electrical discharge machine (EDM) to perform trimming operations without numerous trimming dies and/or other tooling that are typically used for end-cutting operations in prior-art weatherstrip manufacturing processes.

Figure 5:
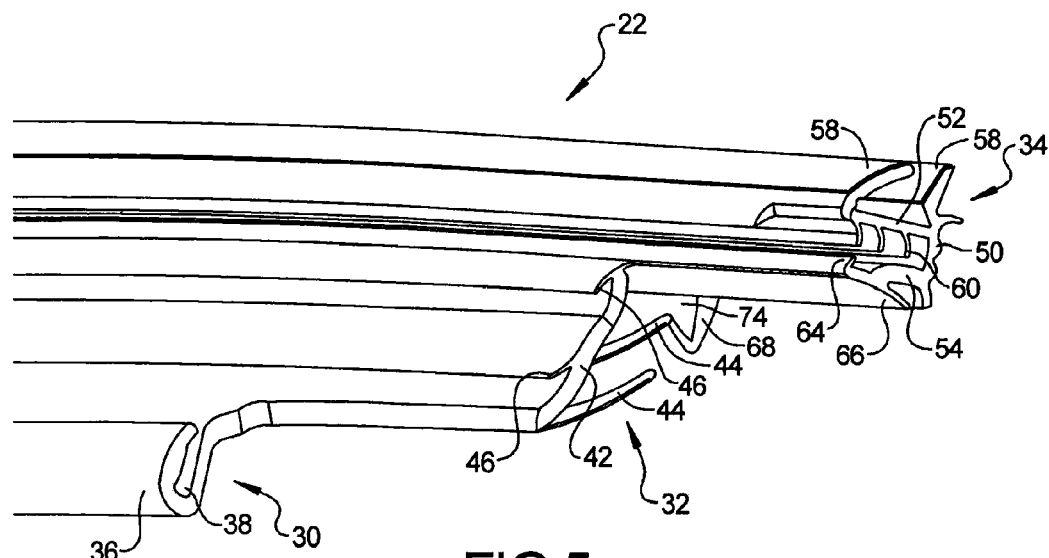
FIG. 5 is a partial perspective view of the portion of the weatherstrip assembly shown in FIG. 2.

Referring now to FIGS. 1, 2 and 5, the header section 22 may be an elongated strip of extruded polymeric material, such as ethylene propylene diene monomer (EPDM), for example. As shown in FIG. 2, the header section 22 may include a first portion 30, a second portion 32 and a third portion 34. As shown in FIG. 5, the first, second and third portions 30, 32, 34 may be cut to first, second and third lengths, respectively. Ends of the first, second and third portions 30, 32, 34 may be trimmed at different angles and/or trimmed to include different contours, for example, to facilitate mating the header section 22 to the door frame 10 and the adjacent pillar sections 24.

The first, second and third portions 30 may be integrally formed with each other. The first portion 30 may include a resiliently flexible first lip 36 defining a generally U-shaped groove 38 that receives a first flange 40 of the door frame 10, as shown in FIG. 2. The first lip 36 may sealingly engage the first flange 40.

The second portion 32 of the header section 22 may be disposed adjacent the first portion 30 and may include a body 42 having a plurality of resiliently flexible second lips 44 extending from the body 42 in a first direction and one or more resiliently flexible third lips 46 extending from the body 42 in a second direction. The second lips 44 may selectively sealingly engage an interior face 48 of the window 20 (FIG. 2). The third lips 46 may sealingly engage the door frame 10 (FIG. 2).

The third portion 34 of the header section 22 may be disposed adjacent the second portion 32 and may include a body 50 having first and second legs 52, 54 defining a generally U-shaped cross section. The body 50 may receive a decorative cap 56 (FIG. 2) or other trim component that may extend around a perimeter of the window opening 16. As shown in FIG. 2, the first leg 52 may include a plurality of fourth lips 58 sealingly engaging the vehicle frame 18 and a plurality of fifth lips 60 sealingly engaging a second flange 62 of the door frame 10. The second leg 54 may include a plurality of sixth lips 64, a seventh lip 66 and an eighth lip 68. The sixth lips 64 may cooperate with the fifth lips 60 to sealingly engage the vehicle frame 18 (FIG. 2). The seventh lip 66 may sealingly engage an edge 70 of the window 20 (FIG. 2). The eighth lip 68 may sealingly engage an exterior face 72 of the window 20 (FIG. 2).

The lips 44, 66, 68 may cooperate to form a generally U-shaped cavity 74 (FIG. 2), which the window 20 can selectively slide into and out of when an occupant of the vehicle moves the window 20 between open and closed positions. As shown in FIG. 2, when the window 20 is in the closed position, the window 20 may be partially received in the U-shaped cavity 74 and the lips 44, 66, 68 may sealingly engage the window 20 to prevent moisture and/or debris from entering an interior of the vehicle through the window opening 16.

Referring now to FIG. 3, the pillar sections 24 may be elongated strips of extruded polymeric material, such as ethylene propylene diene monomer (EPDM), for example. The pillar sections 24 may include a body 76 having first and second legs 78, 80. The first and second legs 78, 80 may include resiliently flexible ninth and tenth lips 82, 84, respectively, and may cooperate to define a generally U-shaped cavity 86. The window 20 may be partially received in the U-shaped cavity 86 such that the ninth lip 82 may sealingly engage the exterior face 72 of the window 20 and the tenth lip 84 may sealingly engage the interior face 48 of window 20.

Figure 4:
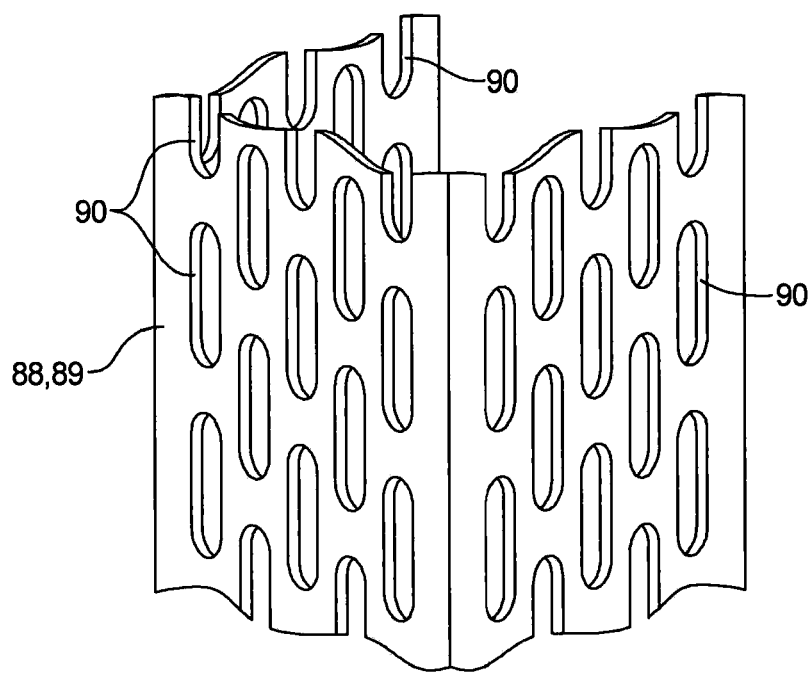
FIG. 4 is a partial perspective view of a reinforcement member of the weatherstrip assembly according to the principles of the present disclosure.

Referring now to FIGS. 2-4, each of the header and pillar sections 22, 24 may include elongated reinforcement members 88, 89, respectively. The reinforcement members 88, 89 may be formed from a metallic material or a relatively rigid polymer, for example, and may include a generally U-shaped cross section. As shown in FIG. 4, one or more faces of the reinforcement member 88, 89 may include a plurality of slots, apertures or openings 90 formed therein. As shown in FIG. 2, the reinforcement member 88 may be at least partially embedded in the body 50 of the third portion 34 of the header section 22 to provide stiffness to the first and second legs 52, 54. As shown in FIG. 3, the reinforcement member 89 may be at least partially embedded in the body 76 of each pillar section 24. While the reinforcement members 88, 89 are shown in the figures as including a generally U-shaped cross section, in other embodiments, the reinforcement members 88, 89 could include alternative cross-sectional shapes.

Figure 6:
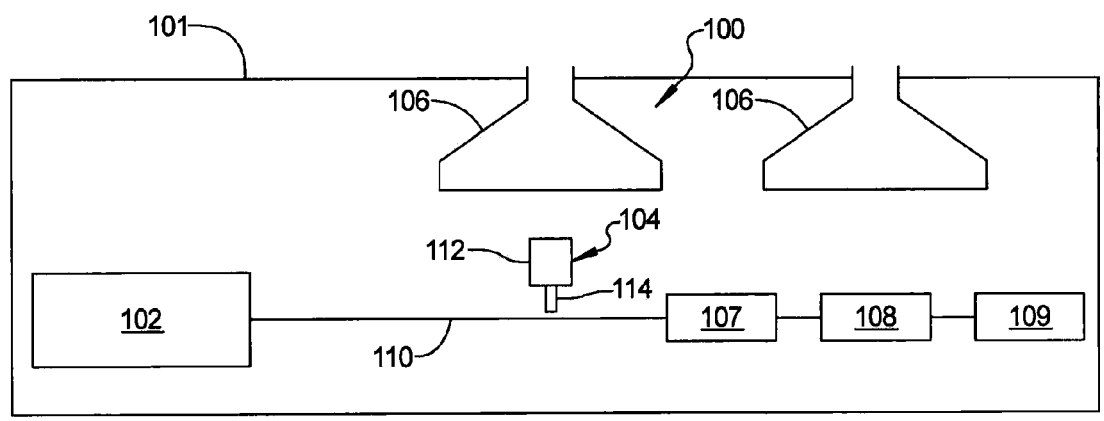
FIG. 6 is a schematic representation of a production line for manufacturing the weatherstrip assembly according to the principles of the present disclosure.

With reference to FIG. 6, a method of manufacturing the weatherstrip assembly 12 shown in FIGS. 1-5 will be described. As described above, the header and pillar sections 22, 24 of the weatherstrip assembly 12 may be formed separately from each other and subsequently joined together to form a continuous seal. As will be subsequently described, the method of the present disclosure may include an extrusion operation, one or more trimming operations, an abrasion operation, a cleaning operation and a joining operation.

The sections 22, 24 (FIG. 1) of the weatherstrip assembly 12 may be manufactured on a production line 100 that may perform some or all of the extrusion operation, the trimming operations, the abrasion operation, the cleaning operation and the joining operation. As shown in FIG. 6, the production line 100 may be disposed within an enclosure 101 and may include an extrusion machine 102, one or more cutting tools 104, one or more fume hoods 106, an abrasion station 107, a cleaning device 108, and a molding station 109. The enclosure 101 can be a plexiglass or other transparent enclosure within a production facility that separates the production line 100 from other equipment, personnel and/or production lines. While the extrusion machine 102, cutting tools 104, fume hoods 106, abrasion station 107, cleaning device 108, and molding station 109 are shown in FIG. 6 as being within the enclosure 101, in some embodiments, one or more of these devices may be disposed outside of the enclosure 101 or in a separate enclosure. It will be appreciated that in some embodiments, the production line 100 may not be disposed within an enclosure.

In some embodiments, a conveyor 110 may carry the sections 22, 24 through the production line 100, e.g., between the extrusion machine 102 and the cutting tool 104, between the cutting tool 104 and abrasion station 107, between the abrasion station 107 and the cleaning device 108, and/or between the cleaning device 108 and the molding station 109. It will be appreciated, however, that each of the extrusion machine 102, cutting tool 104, abrasion station 107, cleaning device 108, and molding station 109 could be separate and discrete machines or stations and may not form a single, unitary production line.

Prior to the extrusion operation, the reinforcement member 88, 89 may be roll-formed to shape and the slots 90 may be stamped or machined into the reinforcement member 88, 89. The reinforcement member 88, 89 may be inserted into the extrusion machine 102, in which EPDM or another polymeric material may be extruded to form an elongated strip having the cross-sectional shape of the header or pillar section 22, 24 (FIGS. 2 and 3) with the reinforcement member 88, 89 embedded therein in the manner described above.

After the extruded material exits the extrusion machine 102, the section 22, 24 may be rough-cut to an approximate length to fit the door frame 10 and the ends of the section 22, 24 may be trimmed for mating with an adjacent section 22, 24. The rough-cut may be performed using a conventional cutting tool (e.g., a saw or knife) or the cutting tool 104. The cutting tool 104 may trim the ends of the section 22, 24 as appropriate to properly mate the section 22, 24 with an adjacent section 22, 24 and/or to suit a shape of a given door frame 10.

The cutting tool 104 may include a robot 112 having a cutter 114 mounted thereto. The robot 112 can be any robotic arm or linkage that is operable to move relative to the workpiece in multiple axes (e.g., in two to five axes) and is programmable to make a plurality of cuts at a plurality of angles without changing a setup of the workpiece or tooling holding the workpiece. The cutter 114 may be a laser cutter or a wire-cutting EDM, for example. The laser cutter can include a gas, fiber-optics or other heat source as the source of cutting energy.

The cleaning device 108 may include one or more brushes or wipers (not shown) adapted to wipe the section 22, 24 and/or one or more nozzles (not shown) adapted to spray air, water or a cleaning solution, for example, at the section 22, 24 to remove soot and/or debris from the section 22, 24. In some embodiments, the cleaning device 108 could include addition or alternative means for cleaning and removing soot and/or debris from the section 22, 24. As shown in FIG. 6, in some embodiments, a fume hood 106 may be disposed at or near the cleaning device 108 to collect any fumes and/or particulate matter that may become airborne during the cleaning operation. In some embodiments, one or more fume hoods 106 may be disposed at additional or alternative locations in the enclosure 101 or in the vicinity of the production line 100.

In an exemplary embodiment, the cutting tool(s) 104 may trim ends of the first, second and third portions 30, 32, 34 of the header section 22 to include the contour shown in FIG. 5. As described above, the first, second and third portions 30, 32, 34 may each include a different length and/or contour and may be cut at different angles. To perform the trimming operations, the robot 112 may initially position the cutter 114 relative to the section 22, 24 to make a first cut of one portion 30, 32, 34 at a first angle. Then, the robot 112 may move the cutter 114 to another position relative to the section 22, 24 to make a second cut of the same or another portion 30, 32, 34. Then, the robot 112 may move the cutter 114 to yet another position relative to the section 22, 24 to make a third cut of the same or another portion 30, 32, 34. Similar trimming operations may be repeated to make as many cuts as desired for a given application. It will be appreciated that a plurality of cutting tools 104 may be employed to perform one or more trimming operations on one or more of the sections 22, 24 of the weatherstrip assembly 12. In some embodiments, a single cutting tool 104 may trim both ends of the section 22, 24, while in other embodiments, one cutting tool 104 may trim one end of the section 22, 24 and another cutting tool 104 may trim the other end of the section 22, 24.

The multi-axis robot 112 may allow these different cuts to be made on a single setup of the workpiece and without a plurality of trimming dies that would be required to make such cuts in prior-art manufacturing processes utilizing a bladed cutting tool. Furthermore, because the cutter 114 may include a laser cutter, a wire-cutting EDM or other similar device, the cutter 114 can make these cuts without applying pressure to the material of the header section 22, thereby eliminating deformation of the cross-sectional profile of the header section 22 during the trimming operations. It will be appreciated that in some embodiments, conventional bladed cutting tools and trimming dies could be used in addition to the cutting tool 104 to perform one or more trimming operations. In some embodiments, the robot 112 could include a cutting blade in addition to or in the alternative to the cutter 114.

During the trimming operations, the cutter 114 may cut through both the polymeric material of the section 22, 24 and the metallic material of the reinforcement member 88, 89 (FIGS. 2-4) without delaminating the polymeric material from the metallic material. That is, the slots 90 (FIG. 4) formed in the reinforcement member 88, 89 may dissipate heat generated during the trimming operations to avoid delamination of the polymeric material from the metallic material.

Any smoke and/or fumes that may be generated while cutting the polymeric and/or metallic material during the trimming operations may be exhausted from the vicinity of the production line 100 through the fume hood 106. An exhaust fan (not shown) may be provided to draw smoke, fumes and/or airborne particulate matter from the trimming operations into the fume hood 106. A duct (not shown) may be provided to receive the smoke, fumes and/or particulate matter from the fume hood 106 and carry the smoke and/or fumes away from the production line 100 and the enclosure 101.

After the one or more trimming operations, the section 22, 24 may be moved to the abrasion station 107, wherein ends of the section 22, 24 may be abraded by a file (not shown) or other abrasive medium. Abrading the ends of the section 22, 24 facilitates adhesion of a polymeric material that is molded onto the ends of the sections 22, 24 to bond adjacent sections 22, 24 to each other during the joining operation.

After the abrasion operation, the section 22, 24 may be cleaned by the cleaning device 108. The brushes, wipers and/or nozzles (not shown) may cooperate to remove soot and/or debris from the section 22, 24 that may have accumulated thereon during the trimming operations and/or during the abrasion operation. Additionally or alternatively, the cleaning operation could be performed before the abrasion operation and/or after the joining operation.

After the abrasion operation and the cleaning operation, the header section 22 and the pillar sections 24 may be joined together during the joining operation. The joining operation may be conducted at the molding station 109. The molding station 109 may include a conventional injection molding machine configured to mold shots 116 (FIG. 1) of a polymeric material over adjacent ends of the header section 22 and the pillar sections 24, thereby adjoining the header section 22 and the pillar sections 24 into a continuous seal. As described above, the abrasion operation roughens surfaces of the ends of the sections 22, 24 to facilitate adhesion between the shots 116 and the sections 22, 24.

It will be appreciated that the sections 22, 24 could be manufactured on a single production line 100 or on multiple production lines that may operate concurrently. It will also be appreciated that the extrusion machine 102, cutting tool(s) 104, fume hood 106, abrasion station 107, cleaning device 108, and/or molding station 109 may not necessarily be dedicated tools or stations used only for the fabrication of the weatherstrip assembly 12. For example, the cutting tool 104 may be programmed to perform other cutting operations to fabricate other workpieces that may be manufactured at a facility at which the method of the present disclosure (or a portion of the method) is performed.

While the weatherstrip assembly 12 is described above as sealing a vehicle door and window, it will be appreciated that the method described above can be used to manufacture weatherstrips or seals for other vehicle structures such as sunroofs, trunks and hoods, for example, as well as for non-vehicle-related machines, devices or apparatus.

What is claimed is:

1. A method of manufacturing a weatherstrip assembly comprising:
    forming an elongated reinforcement member from a first material;
    forming an elongated seal member around the reinforcement member such that the reinforcement member is at least partially embedded in the seal member and the seal member includes a plurality of sealing lips, the seal member being formed from a second material; and
    trimming ends of the seal member and the reinforcement member using a laser cutter mounted on a robotic mechanism that is movable in multiple axes,
    wherein trimming the end of the seal member includes cutting a first portion of the seal member to a first length, then moving the laser cutter relative to the seal member, and then cutting a second portion of the seal member to a second length that is different than the first length, the first and second portions are parts of a single integral weatherstrip body after the first and second portions are cut to the first and second lengths.

2. The method of claim 1, wherein the reinforcement member is formed to include a generally U-shaped cross section.

3. The method of claim 2, wherein the first material is a metallic material, and the reinforcement member is formed to include a plurality of slots extending therethrough.

4. The method of claim 1, wherein trimming the end of the seal member includes trimming a third portion of the seal member to a third, length that is different than the first and second lengths.

5. The method of claim 4, wherein the first portion is adapted to sealingly engage a first flange of a vehicle door frame, the second portion is adapted to sealingly engage a second flange of the vehicle door frame, the third portion is adapted to sealingly engage a window pane.

6. The method of claim 1, further comprising providing a production line on which the seal member is formed, then conveyed to a trimming station to be trimmed by the laser cutter, and then conveyed to a cleaning station to remove soot from the seal member.

7. The method of claim 6, further comprising providing a fume hood proximate the laser cutter.

8. The method of claim 1, further comprising abrading the end of the seal member after the end is trimmed.

9. The method of claim 8, further comprising molding the seal member to another seal member.

10. A method of manufacturing a weatherstrip assembly for a vehicle comprising:
    forming an elongated seal member to include first, second and third portions of the seal member, the first portion being formed to include at least one first sealing lip adapted to sealingly engage a first flange of a vehicle door frame, the second portion being formed to include at least one second sealing lip adapted to sealingly engage a second flange of the vehicle door frame, the third portion being formed to include at least one third sealing lip adapted to sealingly engage a window pane; and
    trimming an end of the seal member using a cutting device that includes at least one of a laser cutter and a wire-cutting electrical discharge machine, the cutting device mounted on a robotic mechanism movable in multiple axes,
    wherein trimming the end of the seal member includes cutting the first portion of the seal member to a first length, then moving the cutting device relative to the seal member, and then cutting the second portion of the seal member to a second length that is different than the first length, the first and second portions are parts of a single integral weatherstrip body after the first and second portions are cut to the first and second lengths.

11. The method of claim 10, further comprising forming a reinforcement member having a generally U-shaped cross section, wherein forming the seal member includes extruding the seal member around the reinforcement member.

12. The method of claim 11, wherein the reinforcement member is formed from a metallic material and includes a plurality of slots extending therethrough.

13. The method of claim 10, wherein trimming the end of the seal member includes trimming the third portion of the seal member to a third length that is different than the first and second lengths.

14. The method of claim 10, further comprising providing a production line on which the seal member is formed, then conveyed to a trimming station to be trimmed by the cutting device, and then conveyed to a cleaning station to remove soot from the seal member.

15. The method of claim 14, further comprising providing a fume hood proximate the cutting device.

16. The method of claim 10, further comprising abrading the end of the seal member after the end is trimmed.

17. The method of claim 16, further comprising molding the seal member to another seal member.

* * * * *